United States Patent

Gleim et al.

[15] 3,686,650

[45] Aug. 22, 1972

[54] ADDRESSING SYSTEM WITH MEANS TO CHECK MECHANICAL STABILITY

[72] Inventors: Ralph A. Gleim; Robert G. Groom, both of Thousand Oaks, Calif.

[73] Assignee: Burroughs Corporation, Detroit, Mich.

[22] Filed: June 1, 1971

[21] Appl. No.: 148,453

[52] U.S. Cl. ....................340/174.1 J, 340/174.1 C

[51] Int. Cl. ....................G11b 5/00

[58] Field of Search...340/174.1 A, 174.1 C, 174.1 J; 179/100.2 MI

[56] References Cited

UNITED STATES PATENTS

| | | | |
|---|---|---|---|
| 3,337,852 | 8/1967 | Lee et al. | 340/174.1 C |
| 3,348,213 | 10/1967 | Evans | 340/174.1 C |
| 3,375,507 | 3/1968 | Gleim et al. | 340/174.1 J |
| 3,511,509 | 5/1970 | Firestone | 340/174.1 C |
| 3,546,686 | 12/1970 | McPherson | 340/174.1 C |

*Primary Examiner*—Vincent P. Canney
*Attorney*—Christie, Parker & Hale

[57] ABSTRACT

Auxiliary tracks of a disc file are used to verify the correct radial position of a movable head assembly relative to the data tracks, to verify the mechanical stability of the head assembly after it has been moved, and to indicate continuously the angular position of the disc relative to the head assembly. Check numbers are recorded serially around the auxiliary tracks. Some of the digits of each check number identify the track and the remaining digits of the check number identify the angular position. The storage and retrieval modes of the disc file system are controlled in response to the check numbers.

5 Claims, 2 Drawing Figures

INVENTORS
RALPH A. GLEIM
ROBERT G. GROOM
BY
Christie, Parker & Hale
ATTORNEY

ADDRESSING SYSTEM WITH MEANS TO CHECK MECHANICAL STABILITY

BACKGROUND OF THE INVENTION

This invention relates to disc file information storage systems and, more particularly, to the efficient use of auxiliary tracks of a disc file system to control the operation thereof.

One class of disc file storage system employs a radially movable head assembly, the position of which is determined by the storage location on the disc to be accessed. Thus, if the storage locations are divided into a number of concentric zones each having a number of tracks, the head assembly may be arranged at any particular position to communicate with one track of each zone, depending upon the position of the head assembly. To communicate with another track, the head assembly must be repositioned. In some disc file systems, a separate auxiliary track is devoted to each head assembly position for the purpose of head assembly position verification. Unique data signals are recorded in the respective auxiliary tracks, and an auxiliary head that is part of the movable head assembly reads these data signals. The position of the head assembly is verified by the retrieval of the desired data signal from the auxiliary head. (See Stuart-Williams et al U.S. Pat. No. 3,479,664, which issued Nov. 18, 1969.) In some disc file systems, a separate auxiliary track and a corresponding auxiliary head are devoted to angular position indication. The information concerning the instantaneous angular position of the disc relative to the head assembly permits the data processor to handle plural access requests in different tracks on the basis of proximity to the address segments to be accessed rather than a "first come" basis. Thus, the average access time of a disc file system is substantially reduced by "quequing up" requests to access address segments that are remote from the head assembly when made. (See Kusnick et al U.S. Pat. No. 3,350,694, which issued Oct. 31, 1967, and Bennett et al U.S. Pat. No. 3,457,998, which issued Apr. 8, 1969.)

SUMMARY OF THE INVENTION

The invention is directed to the use of recorded items of information in the same auxiliary tracks in a disc file system to verify the correct position of a movable head assembly, to verify the mechanical stability of the head assembly after it has been moved, and to indicate continuously the angular position of the disc relative to the head assembly. Preferably, the information items comprise multidigit check numbers some of whose digits identify the track and some of whose digits identify the angular position on the disc. The storage and retrieval operations are controlled in response to the check numbers.

BRIEF DESCRIPTION OF THE DRAWINGS

The features of a specific embodiment of the best mode contemplated of carrying out the invention are illustrated in the drawings in which FIGS. 1 and 2 together form a schematic block diagram of a disc file storage system.

DETAILED DESCRIPTION OF THE SPECIFIC EMBODIMENT

Figure 1:
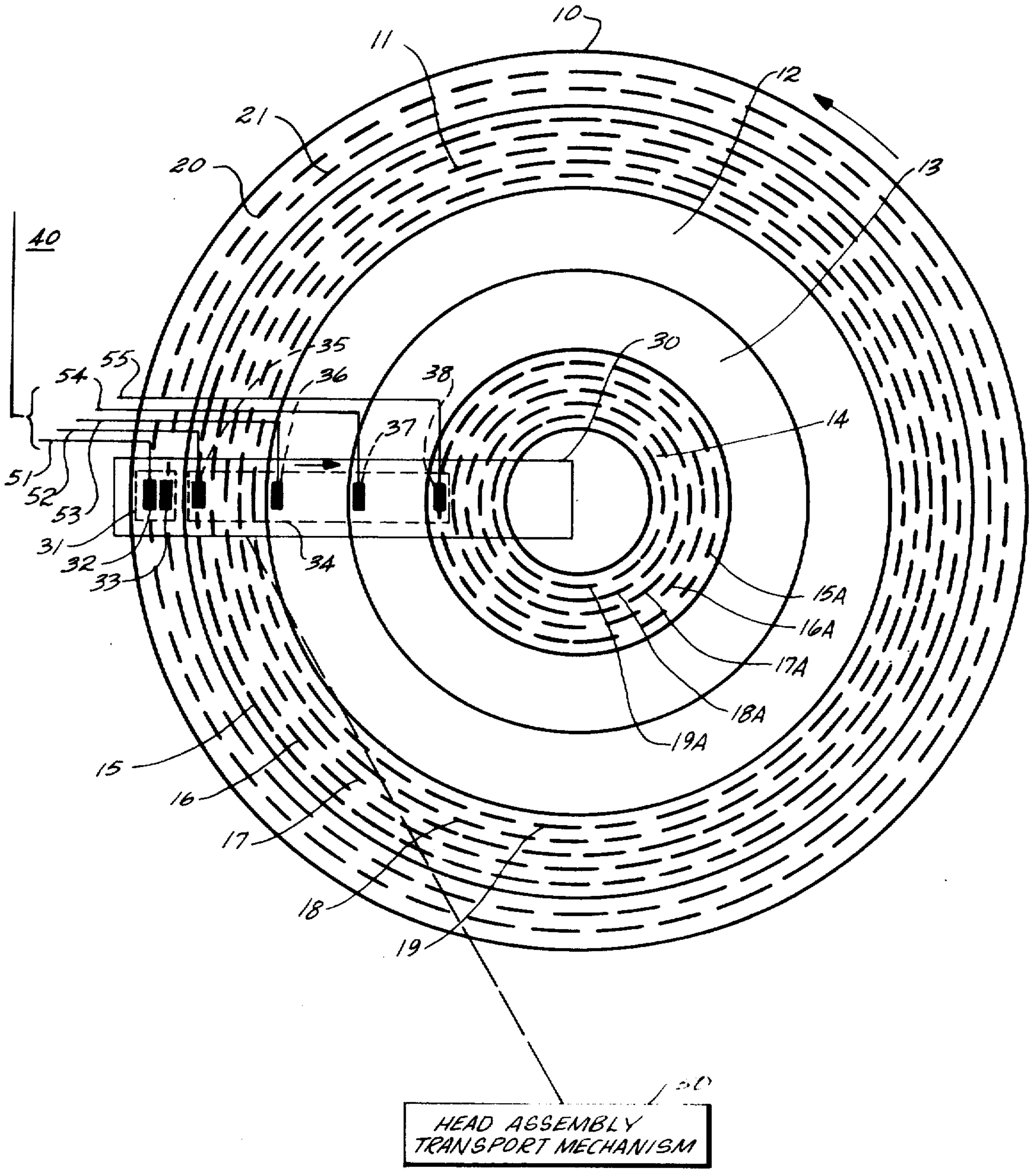

In the drawing, a continuously rotating magnetizable disc 10 of a disc file data storage system has a magnetic surface on which binary data is recorded in concentric tracks. The tracks are grouped in a plurality of annular zones, e.g., zones 11, 12, 13, and 14, which are represented as bounded by imaginary concentric solid circular lines. Each zone has the same number of tracks, e.g., tracks 15, 16, 17, 18, and 19, and tracks 15A, 16A, 17A, 18A, and 19A, which are represented in zones 11 and 14, respectively, by imaginary concentric dashed circular lines. The tracks of zone 14 are auxiliary tracks on which a number of different items of auxiliary information are magnetically stored. The tracks in the remaining zones are service tracks on which data is magnetically stored.

A plurality of clock tracks represented by a single imaginary dashed line 20 are disposed around the outer periphery of disc 10. One clock track corresponds to each zone and is used as a time base to record and recover data from such zone. A stationary head support bracket 30 extends between the center of disc 10 and its periphery adjacent to the magnetic surface. A stationary magnetic head assembly 31 is fixed to bracket 30. Head assembly 31 has a plurality of clock readheads represented by a single block 32, which are aligned with the respective clock tracks. The clock readheads provide from clock information stored on the clock tracks clock pulses for controlling the storage and retrieval of data on disc 10 in a conventional manner.

A plurality of address tracks are represented by a single imaginary dashed line 21. The address tracks correspond to the individual data zones and serve to identify the different data segments around disc 10 where data records are stored in such zones. Head assembly 31 also has a plurality of address readheads represented by a single block 33, which are aligned with the respective address tracks. The address information stored on the address tracks enables access to be gained to any data segment in a conventional manner for the purpose of storage or retrieval of data. Since the conventional clock and address functions are not directly involved in the present invention, they are not described further in this application.

Figure 2:
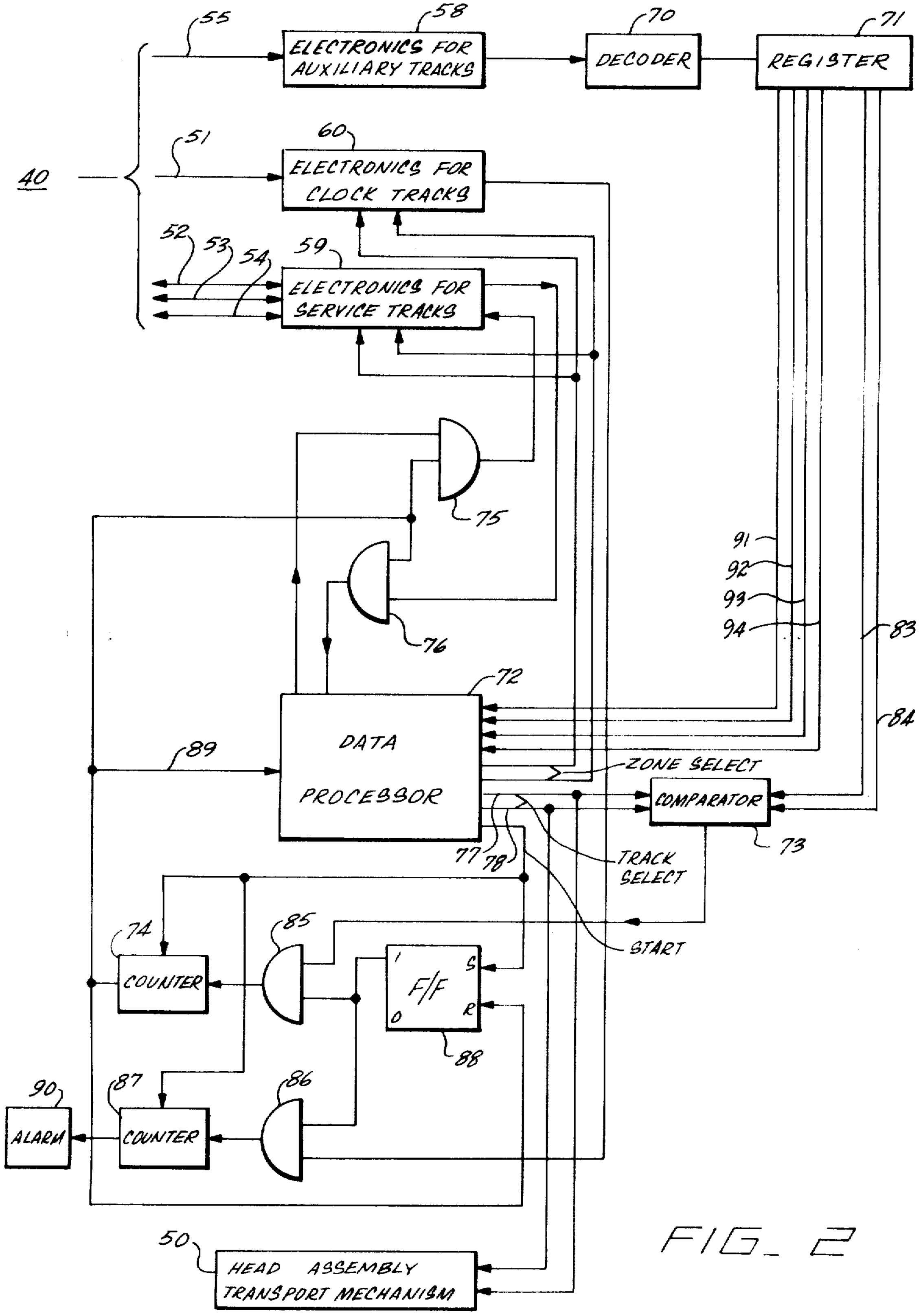

A magnetic head assembly 34 has read-write heads 35, 36, 37, and 38 equal in number to zones 11, 12, 13, and 14 on disc 10. Head assembly 34 is slideably mounted on bracket 30 adjacent to the magnetic surface of disc 10. A head assembly transport mechanism duplicated in FIGS. 1 and 2 as a block 50 translates head assembly 34 radially along the magnetic surface of disc 10 to permit data to be stored and retrieved from the different tracks in each zone. The spacing between heads 35 through 38 is the same as the spacing between the corresponding tracks of zones 11 through 14. When transport mechanism 50 translates head assembly 34 to the position illustrated in the drawing, in which head 38 is aligned with outer track 15A of zone 14, heads 35, 36, and 37 are also aligned with the outer service tracks of their respective zones. In the case of zone 11, this is track 15. Transport mechanism 50 comprises any conventional positional servo system that drives head assembly 34 to a commanded position where heads 35 through 38 of head assembly 34 are aligned with the selected tracks of the zones.

The invention is directed to the use of the auxiliary tracks of zone 14 to verify the correct position of head assembly 34 relative to the selected tracks, to verify the mechanical stability of head assembly 34 after it has reached the selected tracks and to indicate continuously the angular position of disc 10 relative to head assembly 34. For example, six digit binary check numbers could be recorded serially all around each track in zone 14 in conventional fashion. The first two digits of each check number identify the track within zone 14 and are the same for each number recorded on any particular track; the first two digits of the check numbers in the different tracks of zone 14 are different. The last four digits of each check number identify the angular positions around the track and are different for each check number recorded on any particular track. The last four digits of the check numbers occupying the same annular positions in the different tracks of zone 14 are the same, i.e., they are radially aligned. In a typical example, there might be 64 different data zones and one auxiliary zone on disc 10, 50 tracks in each zone, and 2,000 different angular positions designated by the six digit binary check numbers recorded in each of the fifty auxiliary tracks in the auxiliary zone. The first two digits of the check numbers in each auxiliary track are different from the first two digits of the check numbers in each of the other 49 auxiliary tracks. Further, to simplify the processing of the angular positional information, the last four digits of successive check numbers on each auxiliary track increase by one from the last four digits of the preceding check number as disc 10 rotates past head 35.

A cable 40 comprises leads 51 through 55. Specifically, lead 51 is connected from the clock readheads represented by block 32 to electronics for clock tracks represented by a block 60. This electronics comprises amplifiers and shaping networks that produce regularly occurring clock pulses at a frequency equal to the nominal repetition rate of the data read from the corresponding data zone of disc 10 and comprises a switching matrix for selecting the clock track corresponding to the zone of data being accessed. Lead 55 is connected from the address readheads represented by block 33 to electronics for auxiliary tracks represented by a block 58. This electronics comprises amplifiers and shaping networks that produce data pulses representative of the check numbers. Leads 52, 53, and 54 are connected from read-write heads 35, 36, and 37, respectively, to electronics for service tracks represented by a block 59. This electronics comprises read amplifiers and shaping networks that produce pulses representative of the data stored on the data zones in a read mode, write amplifiers and shaping networks for producing driving pulses to actuate heads 35, 36, and 37 during a write mode, and a switching matrix for selecting the data zone to be accessed. The electronics for auxiliary tracks is coupled by a decoder 70 to a storage register 71 which stores each six digit binary check number as it is read from the selected auxiliary track.

Each time it is desired to gain access to a track of disc 10, a data processor 72 for which the disc file system serves as peripheral equipment, issues a two digit track select number, a two digit zone select number, and a start pulse, as represented by the five lines emanating from the right side of data processor 72. The two digit track select number is coupled to head assembly transport mechanism 50 by leads 77 and 78 where it serves as a command signal to drive head assembly 34 to the selected track. The start pulse could be delayed somewhat to let transport mechanism 50 position head assembly 34 before the start pulse appears. After head assembly 34 reaches the selected track, transmission of data to or from the heads of head assembly 34 is not permitted until the position of head assembly 34 over the selected track is verified. Specifically, the two digit track select number issued by data processor 72 is also coupled by leads 77 and 78 to a comparator 73 where it is compared with the two digits from register 71 that identify the track from which head 38 is reading the check numbers. Leads 83 and 84 couple these digits from register 71 to comparator 73. When the two compared digits agree, comparator 73 generates a pulse that is coupled through an AND gate 85 to a counter 74. Clock pulses from block 60 are coupled through an AND gate 86 to a counter 87, which has a capacity that is larger than counter 74. A flip-flop 88 controls the passage of pulses through AND gates 85 and 86. Flip-flop 88 has an S-input, an R-input, a "1" output, and "0" output. When the S-input becomes energized by a start pulse from data processor 72, the "1" output becomes energized, and when the R-input becomes energized by a pulse from the output of counter 74 the "1" output becomes deenergized. The "1" output of flip-flop 88 is coupled to inputs of AND gates 85 and 86 to enable them when the "1" output of flip-flop 88 is energized. The start pulse from data processor 72 also resets counters 74 and 87 to their initial state. When comparator 73 generates a predetermined number of pulses equal to the capacity of counter 74 within a given period of time determined by the capacity of counter 87, the position of head assembly 34 has stabilized mechanically. In other words, when the same two binary digits are read from the auxiliary track a certain number of times in succession or with few interruptions, there is a high probability that the transient mechanical disturbances associated with the change in position of head assembly 34 have died out. Counter 74 senses when the predetermined number of pulses have been generated by comparator 73 within the given period of time, communicates this fact to processor 72 via a lead 89, and serves as an enabling signal for an AND gate 75 and an AND gate 76. When the predetermined number of pulses are not generated within the given period of time, counter 87 reaches its end state before counter 74. When counter 87 reaches its end state, it actuates an alarm 90 which indicates the malfunction of the head assembly, or misalignment of the head assembly with the desired track. Since the clock pulses derived from the clock track occur at predetermined regular intervals, counter 87 serves to measure a given time period.

In a storage mode, data to be recorded on disc 10 is coupled from processor 72 through AND gate 75 to the service track electronics. In a retrieval mode, data read from disc 10 is coupled from the service track electronics by gate 76 to processor 72. The coupling circuits in processor 72 for controlling the transfer to and from the service tracks are not a part of this invention, so they are not described in detail. Processor 72 couples directly to the service track electronics a zone select number to couple data processor 72 through gate 75 or gate 76 to the desired service track of the selected zone.

In summary, the position and mechanical stabilization of head assembly 34 are verified by comparator 73 and counter 74 before data may be transmitted to or from disc 10 through AND gate 75 or AND gate 76.

The four digits from register 71 that identify the instantaneous angular position of disc 10, are coupled by leads 91 through 94 to processor 72. This information permits processor 72 to handle plural access requests in different tracks on the basis of proximity to the address segments to be accessed rather than a "first come" basis. The address information itself stored on tracks 21 is not suitable for this purpose because it does not provide a sufficiently fine resolution of angular position. Hardware and software implementations for processing access requests responsive to angular position information are well known in the art. Preferably, processor 72 itself is programmed to carry out this function. No details of the implementation for processing requests is disclosed, because this is not part of the invention. U.S. Pat. No. 3,350,694 and Patent 3,437,998, which are incorporated herein by reference, disclose such implementations. Rather, the invention involves the recording and recovery of the check numbers, some of whose digits indicate the instantaneous angular position of disc 10, for the purpose of handling access requests.

A more comprehensive verification of the mechanical stabilization of head assembly 35 could be obtained by further checking that the remaining four digits of each check number increase by one over the remaining four digits of the preceding check number and advancing counter 74 only when that condition is met coincident with the first two digits being the same from check number to check number.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, the principles of the invention are applicable to rotating magnetizable drums, as well as discs. In such case, the check numbers recorded on auxiliary tracks of the drum verify different axial positions of a head assembly. The principles of the invention are also applicable to stacks of discs as disclosed in U.S. Pat. No. 3,479,664. In such case, the auxiliary tracks are preferably all on one disc as disclosed in U.S. Pat. No. 3,479,664, the difference being that the information on such disc also represents angular position. Moreover, separate digits of the check numbers would not have to be used to designate track and angular position — the designation of these two quantities could be intermixed in the check number or represented in a single coded number.

What is claimed is:

1. A disc file information storage system comprising:
a rotating magnetizable disc;
a radially movable head assembly disposed adjacent to the disc, the head assembly having a plurality of radially spaced magnetic heads communicating with different magnetizable areas on the disc;
means for moving the head assembly to any one of a given number of radial positions;
the disc having a plurality of auxiliary tracks equal to the given number of head assembly positions, the auxiliary tracks being alignable with one magnetic head of the head assembly in the given positions of the head assembly;
multi-digit check numbers being recorded serially around the auxiliary tracks, some of the digits of each check number identifying the given head assembly position corresponding to the track and the remaining digits of each check number identifying the angular position of the disc;
the disc having a plurality of service tracks, the service tracks being alignable with the remaining magnetic heads in the given positions;
means coupled to the one magnetic head for producing from the check numbers a signal representative of the angular position of the disc;
a data handling unit; and
means coupled to the one magnetic head for exchanging data between the data handling unit and the service tracks on the disc when the check numbers identify a selected one of the given head assembly positions.

2. The system of claim 1, in which the means for exchanging data comprises a source of a select signal representative of the selected one of the given head assembly positions, means for moving the head assembly to the selected one of the given positions, means for comparing the select signal with the corresponding digits of the check number, means for counting the number of identical comparisons, and means for exchanging data between the data handling unit and the service tracks after a predetermined number of identical comparisons indicating the head assembly has stabilized mechanically at the selected one of the given positions.

3. A disc file information storage system comprising:
a rotating disc having a magnetic coating adapted to store magnetically information in N concentric annular zones, each zone having M equally spaced concentric circular tracks;
a radially movable magnetic head assembly having N individual heads communicating respectively with one track of each zone;
means for transporting the head assembly to any one of M given positions in which the heads are respectively aligned with one track of each of the zones;
check numbers being serially recorded in each track of one zone, each check number including a first group of information representative of the particular track in the one zone and a second group of information representative of the angular position of the disc;
a data processor programmed to make request for access to the disc on the basis of proximity to the circumferential portion of the disc to be accessed and to issue a track select signal indicative of one of the given positions of the head assembly;
means for coupling the track select signal to the head assembly transporting means to position the head assembly at the one given position;

means coupled to the head communicating with the tracks in the one zone for producing a first control signal representative of the first information group after the head assembly has been positioned;

means coupled to the head communicating with the tracks in the one zone for producing a second control signal representative of the second information group after the head assembly has been positioned;

means for coupling the second control signal to the data processor to determine the priority of access requests; and means responsive to the first control signal for exchanging data between the other zones of the disc and the data processor when the track select signal and the first control signal are the same.

4. A disc file information storage system comprising:

a rotating disc having a magnetizable surface on which data is magnetically stored in concentric circular tracks;

a radially movable head assembly disposed adjacent to the disc, the head assembly having a plurality of radially spaced magnetic heads communicating with different tracks on the disc;

means for moving the head assembly to any one of a given number of radial positions so as to selectively communicate with the tracks;

the disc having a plurality of auxiliary tracks equal in number to the head assembly positions, the auxiliary tracks being alignable with one magnetic head of the head assembly in the respective given positions of the head assembly;

multiple digit check numbers being recorded serially around the auxiliary tracks, some of the digits of each check number identifying the given head assembly position corresponding to the track and the remaining digits of each check number identifying the angular position of the disc;

the disc having a plurality of service tracks on which records of data are to be stored in predetermined segments, the service tracks being alignable with the remaining magnetic heads in the respective given positions;

a data handling unit;

means responsive to the digits of the check numbers identifying the given head assembly position after each change in position of the head assembly for exchanging data between the data handling unit and the service tracks on the disc; and means responsive to the digits of the check numbers identifying the angular position of the disc for selecting the segment of disc to be accessed.

5. An information storage system comprising:

a rotating magnetizable storage means;

a movable head assembly disposed adjacent to the storage means, the head assembly having a plurality of spaced magnetic heads communicating with different magnetizable areas on the storage means;

means for moving the head assembly to any one of a given number of positions corresponding to the respective areas on the storage means;

the storage means having a plurality of auxiliary tracks equal to the given number of head assembly positions, the auxiliary tracks being alignable with one magnetic head of the head assembly in the respective given positions of the head assembly;

auxiliary information being recorded serially around the auxiliary tracks, the auxiliary information identifying the given head assembly position corresponding to the track and the angular position of the storage means;

the storage means having a plurality of service tracks, the service tracks being alignable with the remaining magnetic heads in the respective given positions;

means coupled to the one magnetic head for producing from the auxiliary information a signal representative of the angular position of the storage means;

a data handling unit; and means coupled to the one magnetic head for exchanging data between the data handling unit and the service tracks on the storage means when the auxiliary information identifies a selected one of the given head assembly positions.

* * * * *